2 Sheets—Sheet 1.

S. T. LOCKWOOD.

PACKER FOR BRAN AND OTHER ARTICLES.

No. 10,827. Reissued Apr. 19, 1887.

ATTEST.

J. Henry Kaiser

Wm. H. Scott

INVENTOR.

Samuel T. Lockwood,

By J. N. McIntire

Attorney

S. T. LOCKWOOD.

PACKER FOR BRAN AND OTHER ARTICLES.

No. 10,827. Reissued Apr. 19, 1887.

ATTEST.
J. Henry Kaiser
Wm. H. Scott

INVENTOR.
Samuel T. Lockwood
By J. N. McIntire
Attorney

UNITED STATES PATENT OFFICE.

SAMUEL T. LOCKWOOD, OF CHICAGO, ILLINOIS.

PACKER FOR BRAN AND OTHER ARTICLES.

SPECIFICATION forming part of Reissued Letters Patent No. 10,827, dated April 19, 1887.

Original No. 325,254, dated September 1, 1885. Application for reissue filed January 3, 1887. Serial No. 223,340.

*To all whom it may concern:*

Be it known that I, SAMUEL T. LOCKWOOD, a citizen of the United States of America, residing at Chicago, in the county of Cook and State of Illinois, have invented certain new and useful Improvements in Bran-Packers or Packers for Packing Bran and other Articles, of which the following, in connection with the accompanying drawings, is a specification.

Figures 1, 2, 3:
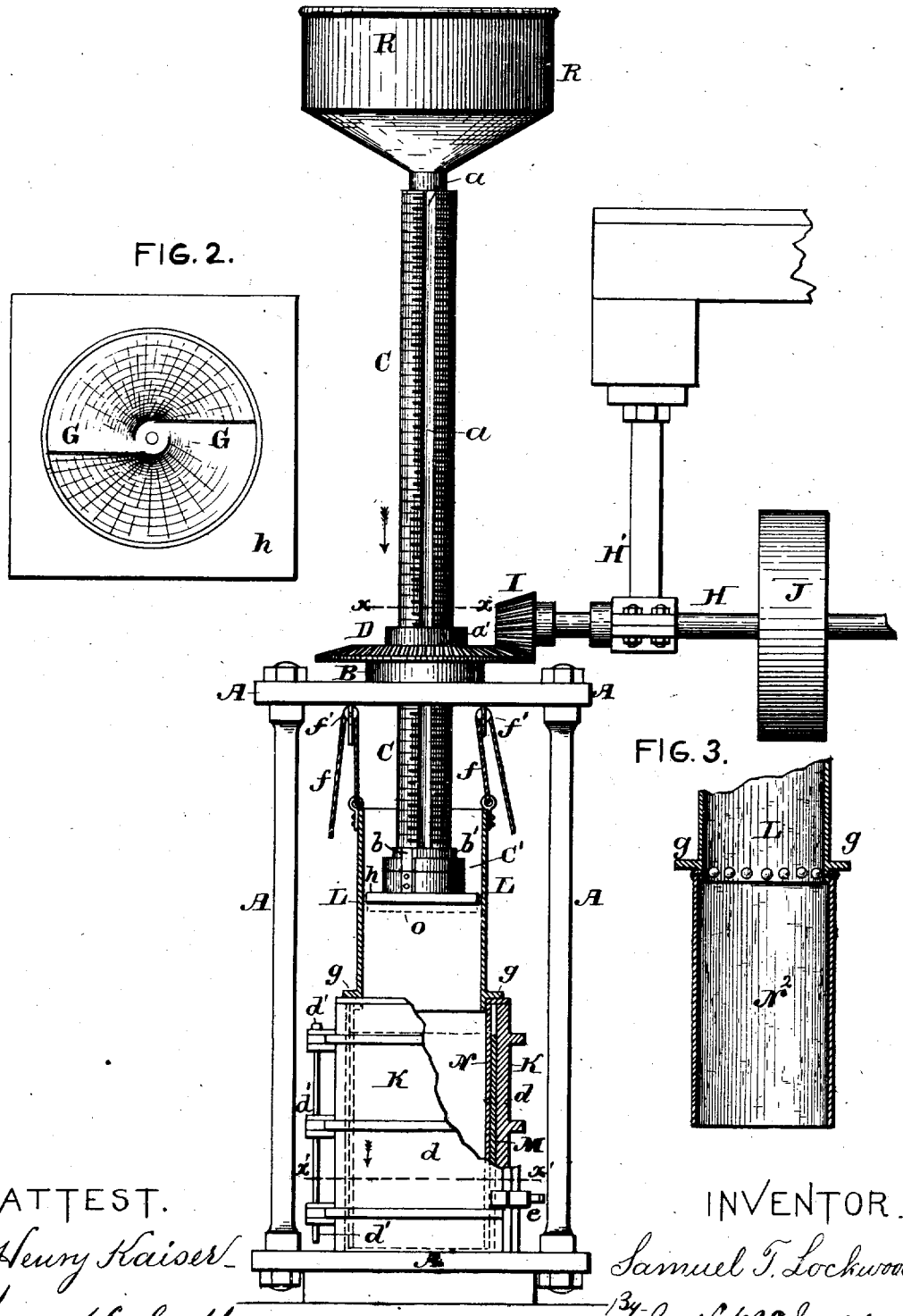
Figure 4:
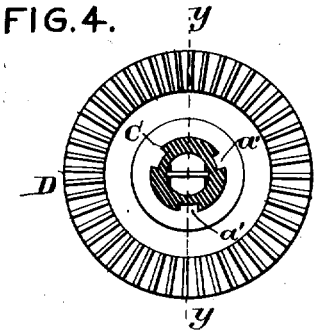
Figure 5:
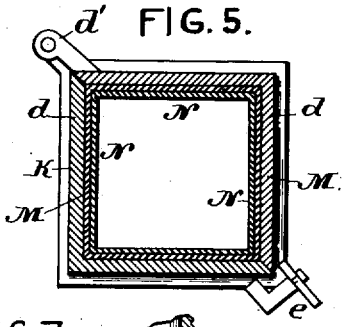
Figure 7:
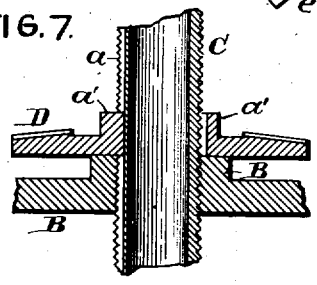
Figure 6:
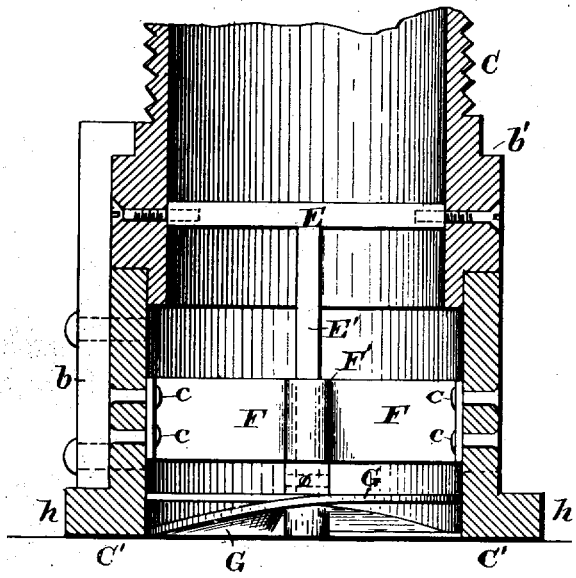
Figure 8:
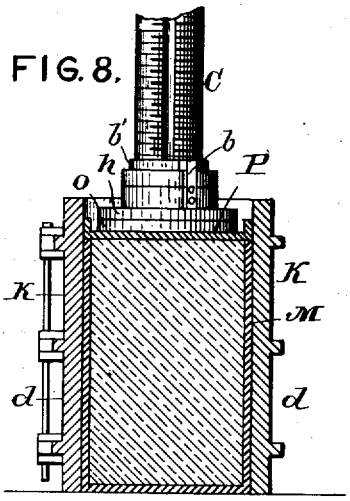

In the drawings, Figure 1 is a side elevation, with some of the parts shown in vertical section, of a packer embodying my improvements. Fig. 2 is a bottom view of the packing-cylinder on an enlarged scale, and showing the parts applied thereto. Fig. 3 is a sectional detail view representing a certain modification in the construction. Fig. 4 is a section in the plane of the line *x x* of Fig. 1, viewed in the direction indicated by the arrow there shown. Fig. 5 is a section in the plane of the line *x′ x′* of Fig. 1, viewed in the direction of the arrow there shown. Fig. 6 is a partial sectional view, on a greatly enlarged scale, of the lower part of the packing-cylinder, and showing the parts therein and connected thereto. Fig. 7 is a section in the plane of the line *y y* of Fig. 4; and Fig. 8 is a vertical sectional view of the packing-box and the parts therein, and also showing the position of the packing-cylinder with relation thereto at the completion of the work of packing.

Like letters of reference indicate like parts.

A represents a strong frame. B is a block having a central circular opening which is screw-threaded, as indicated in Fig. 7. This block is rigidly attached to the frame A, or it may form a part thereof.

C is a hollow or tubular screw or feed-tube fitted to and working in the block or nut B.

D is a mitered cog-wheel, through which the screw C passes. In the screw C are longitudinal grooves *a a*, one or more, and *a′ a′* are ribs projecting from the hub of the wheel D into the grooves *a a*. The wheel D rests and turns freely on the block B.

C′ may be termed a "downward extension" or continuation of the hollow or tubular part C, and *b b* are clasps or lugs engaging an annular rib or shoulder, *b′*, at or near the lower end of the part C, as is clearly indicated in Figs. 1, 6, and 8. These clasps or lugs are firmly attached to the part C′, and the latter is thereby connected to the screw C in such a manner that the latter may be rotated without rotating the part C′, while the latter will move up and down with the said screw as it is raised and lowered.

E is a rod or cross-bar, attached at its ends to the screw C, and E′ is a rod depending from the bar E. The part E, as indicated in Fig. 6, is arranged within the screw C and located at or near its lower end, and the part E′ extends down into the part C′.

F F are wings (two or more) extending radially from the central part or hub, F′, through which the pendant E′ passes freely. The outward ends of the wings F F are rigidly attached to the part C′ by means of rivets or otherwise, as is indicated at *c c*, Fig. 6.

G is an auger-like device applied rigidly to the lower end of the rod E′.

H is a shaft turning in a hanger, H′, and having on one end a mitered pinion, I, engaging the wheel D. J is a pulley or belt-wheel on the shaft H.

In practice I make provision for rotating the shaft H in reverse directions alternately, and also for varying the speed of its rotation; but as such gearing is common and well known I have not here shown the same nor described it with particularity. Furthermore, it does not constitute a part of my invention, as any suitable driving-gear may be employed.

K is a box, which in the example shown is square, or nearly so. This box I make in two rectangular pieces, *d d*, hinged to each other along one corner, as indicated at *d′*, and adapted at the diagonally-opposite corner to be temporarily clasped or clamped together, as indicated at *e*, my purpose being so to construct the box that it will be strong and capable of being opened with facility for the removal of the bag, as will hereinafter more fully appear, and any well-known or suitable details of construction which will permit the box being so opened may be employed.

L is a box or tube arranged directly above the box K, and there suspended by means of cords *f f*, running over pulleys depending from the upper part of the frame A. The lower end of the box L may be flanged, as shown at *g g*, for the purpose hereinafter referred to. The said box also projects somewhat below the said flanges, so as to enter the upper end of the box K a little way when the box is arranged in the position indicated in Fig. 1. The box L may be termed a "detachable extension" upward of the box K. As the boxes are square, attention is called to the fact that the lower end of the downward extension or part C′ is flanged, as shown at *h*, in such a manner as to meet or nearly meet the sides of the boxes. (See Figs. 1 and 8.)

M is a bag arranged in and fitting the box K, and N N are removable, thin, and smooth metallic plates arranged within the bag.

O is a plate or block arranged next below the flange *h*, as shown in Fig. 8, and P is a piece of cloth arranged below the plate O.

R is a feed hopper or funnel entering the upper end of the screw C.

In Fig. 3 I have shown a modification in which the box L is provided with downward extensions $N^2$ of its sides of such length that said extensions $N^2$ will perform the functions of the separate plates N in the form of machine illustrated in the other figures of the drawings. When employing this form of construction, there should be room enough between the top of the box L and the head of the frame A to permit the upper box to be withdrawn upward from the box K, for the purpose hereinafter explained.

To use this machine for the purposes for which it is adapted, I proceed as follows: I place a suitable bag in the lower box, the latter being closed and fastened, and in the bag I arrange the plates N N, as illustrated at Figs. 1 and 5; or, in case of the use of the modification shown at Fig. 3, I place within the bag the downward extensions $N^2$ of the box L. I then set the machine in motion, running the driving-gear in such a direction as to carry the lower end of the tube C down to the bottom of the bag. I now feed the bran in through the hopper R, the bran of course filling the tube C and being fed in as may be required. The movement of the machine is then reversed. In other words, it is so run that the screw C will be raised while being rotated. As the flange *h* is square and fits into the box K, or, in other words, fits in between the plates N, which are arranged within said box, the part C′ will not turn with the screw, but will move up and down with it, owing to the manner in which the screw and part C′ are connected to each other. The wings F F, therefore, do not turn or rotate. The auger-like device G on the lower end of the bar E′ rotates with the screw C, for the reason that the bar E, from which the bar E′ depends, is attached to the said tube. By this means the bran will be forced out through the auger-like device into the bag and be firmly packed therein, it being understood that the plates N N are only expedients to hold the bag open properly and to prevent the bran from pushing or drawing the bag down in the manner hereinafter more fully explained. The wings F F, of which there may be any suitable number, prevent the bran from being whirled next above the device G. I feed the machine and allow it to run until the bag, and also the box L, are packed full. After that I stop feeding, but allow the screw C to continue moving upward until I can place the plate O next underneath the flange *h* and the cloth P next under the plate O. I now reverse the direction of movement of the screw C, which will then move down and press the bran in the box L into the bag. Now, by opening the box K and raising the box L and removing the plates N N the cloth P may be sewed to the bag, so as to serve as a top therefor. Then, on raising the screw C, the bag may be removed. I find that a very large amount of bran may thus be packed and pressed into a comparatively small bag, the amount in a bag of given size being much greater, as I believe, than by means heretofore in use.

The machine, as is obvious, may also be employed with advantage for packing and pressing other materials or substances.

I am aware that bran has heretofore been packed by being fed through an auger-like device on a solid shaft and rotated in a descending bag; and I desire to state that I do not here intend to be restricted to any particular means for holding or retaining the bag, nor to the supplemental extension of the bag-holding box.

Having thus described my invention, what I claim as new, and desire to secure by Letters Patent, is—

1. In a machine adapted to feed and pack bran or other material into a suitable receptacle, a rotative tubular screw-shaft or threaded feed-tube turning within a fixed nut or screw-threaded bearing, and provided with an auger-like device for ejecting the bran or other material from said feed-tube and compressing it within the receptacle into which it is to be packed, all combined substantially as hereinbefore shown and described.

2. In combination with the packing-box, the auger-like packer G, a screw-shaft for rotating and for also raising and lowering said packer, and the device C′, which encompasses the auger-like packer and has only a sliding movement within the said packing-box, all substantially as and for the purposes set forth.

3. In combination with a polygonally-shaped box or package-receptacle, K, a rotatory auger-like packer, G, and a device, substantially such as shown at C′, the tubular interior of which conforms to the circular shape of the packer and which is formed or provided with a base portion of a polygonal exterior contour corresponding substantially with the contour of the box or package-receptacle, all substantially as and for the purposes hereinbefore described.

4. The combination, in a packer, of a rotative tubular screw or feed-tube, an auger-like device in connection with and carried by the said tube, a fixed screw-threaded bearing for the said tube, and a driving or rotating wheel splined to the said tube.

5. The combinaton, in a packer, of a rotative tubular screw or feed-tube, a fixed screw-threaded bearing for the said tube, a tubular extension clasped to the lower end of part of the said tube and capable of turning thereon, the wings F F, carried by the said extension, and the auger-like device G, carried by the said feed-tube, substantially as and for the purposes specified.

6. In combination with a packing-box and an auger-like packer arranged to work therein, a screw-shaft working in a stationary nut, so as to both rotate and elevate the packer during the operation of filling and compressing the material within the packing-box, as set forth.

7. The combination, in a packer, of a packing-box with an extension, L, an auger-like packer, G, a screw-shaft which operates to rotate and also to raise and lower the packer, and a removable plate or platen, O, whereby (in the absence of the plate O) the material may be first packed within the packing-box and its extension and then (with the plate O introduced beneath the packer) pressed down in the packing-box, substantially as set forth.

In testimony that I claim the foregoing as my own I hereby affix my signature in presence of two witnesses.

SAMUEL T. LOCKWOOD.

Witnesses:

WALTER T. DWIGHT,
JAS. VAN BUREN.